Patented Nov. 14, 1922.

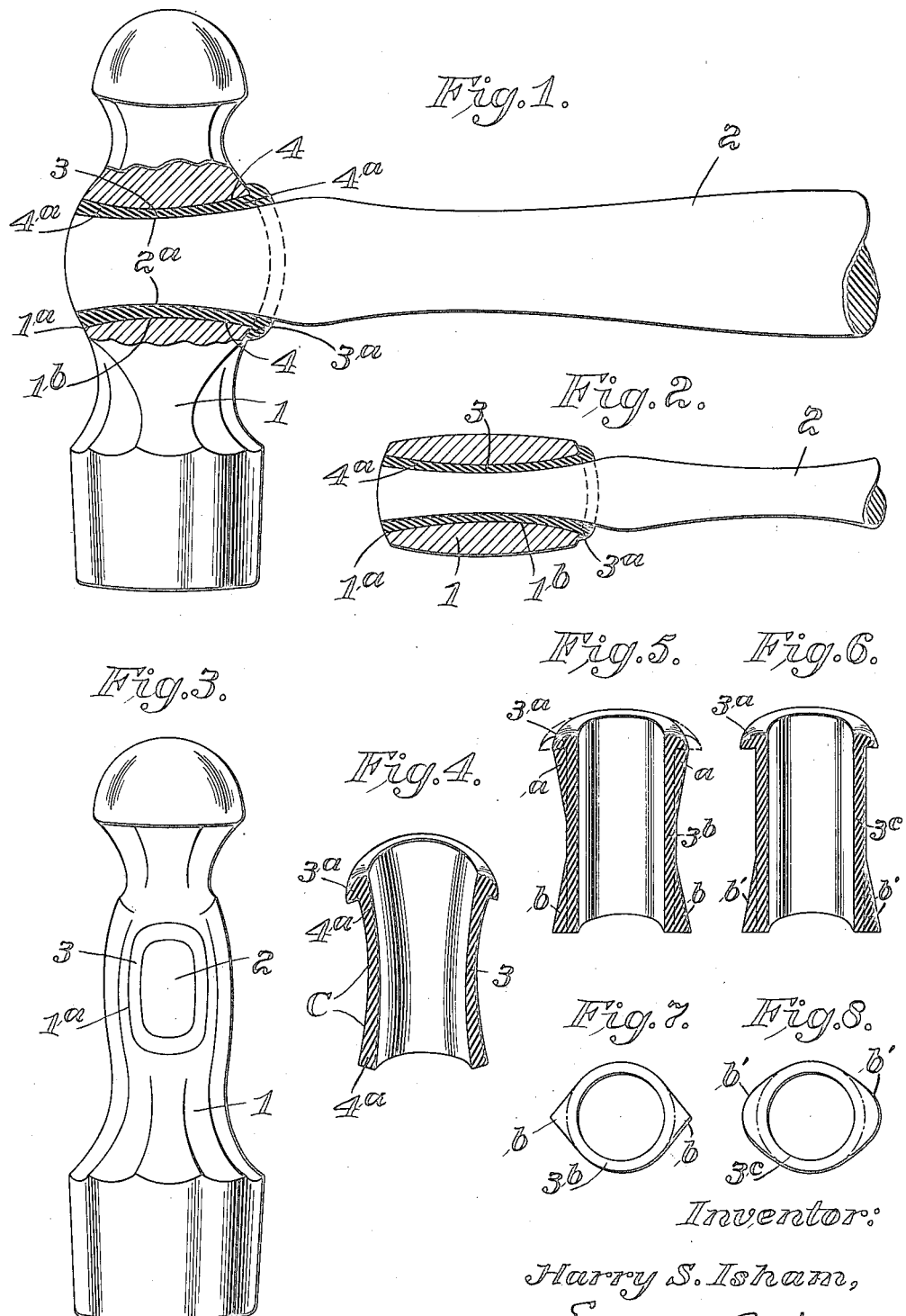

1,435,851

UNITED STATES PATENT OFFICE.

HARRY STEVENS ISHAM, OF BELMAR, NEW JERSEY.

RUBBERSET CUSHIONED IMPLEMENT HANDLE AND INSERT THIMBLE.

Application filed April 14, 1920. Serial No. 373,864.

*To all whom it may concern:*

Be it known that I, HARRY S. ISHAM, a citizen of the United States, residing at Belmar, in the county of Monmouth and State of New Jersey, have invented certain new and useful Improvements in Rubberset Cushioned Implement Handles and Insert Thimbles; and I do hereby declare the following to be a full, clear, and exact description of the invention, such as will enable others skilled in the art to which it appertains to make and use the same.

This invention relates to an improved construction and arrangement of the eyes of implements, their handles and elastic cushions, as rubber, for securing the handle in the eye.

The principal object of the invention is to provide a cushioned, adherent means for securing a handle in the eye of an implement, such as a hammer, hatchet, sledge ax, maul, stone cutter's implement, or other implement, so as to make a strong joint and an inseparable union, and at the same time be sufficiently yielding or resilient as to save the hand, wrist and arm muscles of the operator from jars, strains and vibrations incident to the use of such implements as ordinarily constructed.

A special object is to provide insert-thimble cushions of such construction that they can be readily aplied by anyone to an eye of an implement for securing it on a handle, that is on a new handle in case the old handle breaks or because detached from the implement head, or on a handle in the usual course of manufacture:

A particular object in my insert-thimble is to provide an adherent cushion, so constructed, with an end rim or shoulder and shaped walls, that it will fit the eye as to diameter and length, and will not be driven through and beyond the end of the eye when inserting and securing the handle in place, thus preventing waste of material and the trouble of cutting and trimming off superfluous material after the handle has been fixed in the eye within the cushion.

In case rubber tubing is used to make the insert-thimble as heretofore, almost or quite a double length of tubing must be used over that actually left in the eye, by reason of the fact that in driving the handle into the thimble in the eye of an implement an extra length of the tubing will be crowded through and will protrude at the end of the eye. This extra material must then be cut off and neatly trimmed, entailing waste of material and consuming time in the operation. My present invention overcomes these objections and provides an insert-thimble which can be made and sold separately, and applied by any mechanic when the handle of his hammer or other implement breaks or becomes detached from the head. With my improved construction of insert-thimble a rubber cushion hammer can be fitted with a new handle with greater ease and speed than can an old form of hammer be secured on an old form of handle.

The matter constituting my invention will be defined in the claim.

I will now describe my improvements in detail by reference to the accompanying drawings, in which—

Figure 1 represents a sectional view of the head of a hammer showing my invention, the handle being in elevation and partly broken away.

Fig. 2 is a sectional view through the handle and a portion of the head of the hammer.

Figure 3 represents an end view of my rubberset hammer.

Figure 4 represents a sectional perspective view of my insert-thimble.

Figure 5 represents a similar view of a modified construction.

Figure 6 represents a similar view of another modified form.

Figure 7 represents an outer end view of the insert-thimble shown in Figure 5.

Figure 8 represents an end view of a modified form of thimble.

For the purpose of illustration I have shown a common form of hammer 1 having an eye $1^a$ of peculiar formation, that is with a contracted or convexed wall $1^b$. Opposite walls are preferably made convex, and if only two walls are so made they will preferably be those which are toward the opposite ends of the hammer head, as shown in Fig. 1. The four walls or sides of the eye may be made convex as indicated in Figs. 1 and 2. The greatest contraction or convexity is preferably midway in the length of the eye but my invention is not limited to such detail of construction. In case of a long elliptical and comparatively narrow eye, as of a hatchet or ax, only the walls towards the ends of the head may be convexed. For such implements and heavy forge sledges I preferably use insert-thimbles having side lugs, as shown in Figs. 5, 6, 7 and 8.

The handle 2 is preferably made at its outer end with concavities 2ª on two or more sides corresponding in position to the convexities in the eye, but not corresponding in the amount or degree of concavity. That is, the concavities are described by arcs of larger circles or by curves which do not coincide with the curves of the convex portions of the eye, so that the spaces 4 between the eye and the handle will be greater at or near the ends of the eye than at the midway portion. By this construction opposed wedge portions 4ª are provided or produced in the insert-thimble when the handle is seated and fixed in place. The relative sizes of the eye and handle are such that, the handle will loosely enter the eye and leave a space for the insert-thimble cushion.

The cushion 3 is preferably made of rubber or a rubber composition which is sufficiently strong and resilient or elastic to yield and be distorted when the handle is forced into it in the implement eye. I preferably make my insert-thimble 3 in the shapes shown in Figs. 4 to 8 inclusive, and will, preferably be of the same length as the eye it is intended to fill, but may be either a little longer or a little shorter. The rubber thimble is moulded and vulcanized in a well known way. In all forms the thimble 3, 3ᵇ or 3ᶜ, is made with a shoulder or rim 3ª at one end—the inner end when in position is an eye of an implement, as indicated in Fig. 1. This rim is in the nature of an annular flange and will be sufficiently thick and strong to act as a stop when the handle is forced into the thimble, said rim bearing against the metal surrounding the eye and preventing the inner end of the thimble from being crowded into the eye. The wall may be slightly contracted or concaved longitudinally as indicated at C, Fig. 4, for better conforming to the shape of the eye, but this is not essential for the reason that the elasticity of the material will permit the thimble to be distorted under pressure to fill the eye. The modified form of thimble 3ᵇ shown in Fig. 5 has wedge shaped lugs or bosses $a$ at the inner end and similar bosses $b$ at the outer end on opposite sides as shown in Fig. 7. These bosses are wedge shaped longitudinally and extend a little less than half the length of the thimble, and may be either V-shaped or crescent shaped transversely as shown in Figs. 7 and 8. These bosses will preferably be cast or moulded with the thimble. Where the bosses are used the main interior wall of the thimble may be straight longitudinally, as shown in Figs. 5 and 6. Thimbles with these bosses are more particularly adapted for use in hatchets, axes and heavy forge sledges and miners hammers. They furnish safety devices for heavy striking sledges.

While my insert-thimble is well adapted for use primarily in the manufacture of hammers and other implements with attached handles, they are not confined to such use, but will be made and sold separately for convenient application and use of the mechanic or other person who wishes to attach a tool head to a new handle. They will be inexpensive and very convenient for providing a rubber-set handle in various kinds of implements.

Rubber being highly elastic and distortable will adapt itself to the contour of the surfaces with which it is brought into contact when the handle is forced into a thimble cushion in the eye of an implement. The space between the head and handle will be filled with a body of material under a high degree of compression although its elastic properties are not materially diminished. The cushion when in place is thicker at its ends than at its middle portion, the two ends being, in effect, oppositely disposed wedges which resist initial relative movements of the head and the handle. The high frictional properties of rubber are available for preventing slipping of these wedges, although the fact that they constitute parts of a single unit makes it unnecessary to rely upon friction for holding said wedges in position.

The masses of the elastic cushion which are disposed in the ends of the eye, are larger than the intervening connecting mass of said cushion, and these larger masses admit of considerable amplitude in the oscillations of the handle relative to the head of the implement. Shocks transmitted from the head to the handle are therefore reduced to a minimum, the force of a blow being dissipated or absorbed by various parts of the thimble cushion. In assembling the parts I preferably use a lubricant composed of a solution of rubber and dip the insert-thimble into such solution and then place it in the eye of the implement and force in the concaved end of the handle so as to force the thimble into place with its rim or flange 3ª seated against the metal of the implement around the inner end of the eye as indicated in Fig. 1. Evidently the thimble may first be inserted in the eye and the end of the handle dipped into the lubricant and then forced into place so as to distort the thimble cushion and force the material thereof into the wider spaces 4 and form the interlocking wedges 4ª at the opposite ends of the eye. The solvent of the rubber is fugitive and soon evaporates leaving the rubber in solid form which acts as a cement.

The flange 3ª acts as an effective stop and prevents the thimble from being forced partly beyond the eye of the tool head, and, therefore, prevents waste of material and loss of time for cutting and trimming the thimble.

A hammer or other implement equipped with my invention—rubberset—protects the hand, wrist and arm muscles from shock of impact and vibration, prevents the head of the implement from chipping and enables the operator to maximize the force of a blow, thus saving the strength and labor and avoiding much of the usual fatigue incident to work with a hammer or a similar implement.

This rubberset handle may be of wood or other suitable material.

Having described my invention, what I claim, and desire to secure by Letters Patent is:—

The combination with an implement head provided with an eye having a median contraction of a handle having an end portion smaller than, and of approximately the shape of said eye, and a compressed elastic cushion filling and conforming to the space between said head and handle, said cushion being provided with a flange to determine its position in said eye.

In testimony whereof, I affix my signature.

HARRY STEVENS ISHAM.